United States Patent [19]

Townsend

[11] Patent Number: 5,220,884

[45] Date of Patent: Jun. 22, 1993

[54] KENNEL CUSHION SYSTEM

[76] Inventor: Phyllis E. Townsend, 1421 Linda La., Copperas Cove, Tex. 76522

[21] Appl. No.: 918,769

[22] Filed: Jul. 27, 1992

[51] Int. Cl.⁵ ............................................. A01K 1/015
[52] U.S. Cl. ................................. 119/19; 119/28.5; 5/462; 5/420
[58] Field of Search ............... 119/15, 17, 19, 28.5, 119/156; 5/448, 462, 417, 420

[56] References Cited

U.S. PATENT DOCUMENTS

| | | | |
|---|---|---|---|
| 1,974,723 | 9/1934 | Richig | 155/182 |
| 3,537,116 | 11/1970 | Kain | 5/420 |
| 3,538,508 | 11/1970 | Young | 2/3 |
| 3,604,026 | 9/1971 | Schelps | 5/337 |
| 3,781,931 | 1/1974 | Knickerbocker | 5/337 |
| 3,797,461 | 3/1974 | Breeden | 119/19 |
| 4,050,417 | 9/1977 | Ellis | 119/156 |
| 4,198,718 | 4/1980 | Ballard | 119/19 |
| 4,383,713 | 5/1983 | Roston | 297/219 |
| 4,539,935 | 9/1985 | Meyer | 119/19 |
| 4,649,582 | 3/1987 | Cho | 5/434 |
| 4,844,016 | 7/1989 | Filosa | 119/19 |
| 4,853,994 | 8/1989 | Ekstein | 5/437 |
| 4,934,005 | 6/1990 | Martin et al. | 5/431 |
| 4,943,105 | 7/1990 | Kacar et al. | 119/15 |
| 4,985,950 | 1/1991 | Gladish | 5/437 |
| 4,999,863 | 3/1991 | Kane | 5/420 |
| 5,085,212 | 2/1992 | DeCosta | 5/417 |
| 5,127,367 | 7/1992 | Starowitz | 119/28.5 |

Primary Examiner—John G. Weiss
Attorney, Agent, or Firm—Cushman, Darby & Cushman

[57] ABSTRACT

A cushion assembly is provided for a portable kennel. The cushion assembly includes a central pillow portion shaped to substantially conform to a shape of a bottom surface of the kennel; a peripheral pillow portion having a distal edge connected to peripheral edges of the central pillow portion, the peripheral pillow portion extending upward from the peripheral edges of the central pillow portion in a generally vertical direction; and fastening members for fastening the peripheral pillow portion to the kennel so that the peripheral pillow portion is maintained in position against at least a portion of interior walls of the kennel while a surface of the central pillow portion is maintained in position against the bottom surface of the kennel.

4 Claims, 3 Drawing Sheets

KENNEL CUSHION SYSTEM

FIELD OF THE INVENTION

This invention relates to a cushion for use in a portable pet kennel for preventing an animal placed therein from being disturbed or injured during transit.

BACKGROUND OF THE INVENTION

A variety of portable pet-kennels have been developed to house pets during transit. Conventional pet kennels are typically constructed from plastic or wire mesh. When an animal is placed in such a kennel, the animal may be jostled during loading and unloading of the kennel prior to, or after transit, or during a turbulent transport of the kennel. Such jostling causes the animal be thrown about the interior of the kennel, allowing the animal to contact the interior walls thereof. Such contact may irritate or injure the animal.

Cushions have been used with kennels to provide comfort for the animal during transit. For example, conventional pillows are commonly placed on the floor of the kennel to provide cushioning for the animal. However, the pillow does not prevent the animal from contacting the interior side walls of the kennel during transit. In addition, the pillow may slide within the kennel during transit and actually cause the animal to contact the interior walls of the kennel. Movement of the animal in such kennels may be particularly harmful or upsetting when transporting sick or injured animals.

Accordingly, it can be appreciated that a need exists to provide a cushion which remains stationary while disposed in an interior portion of a portable kennel to provide comfort to an animal disposed therein, particularly, while the kennel is transported.

SUMMARY OF THE INVENTION

An object of the present invention is to fulfill the need referred to above. Another object of the present invention is the provision of a cushion of the type described which is simple in construction, effective in operation and economical to manufacture.

In accordance with the principles of the present invention these and other objectives are obtained by providing a cushion assembly for a portable kennel including a central pillow portion shaped to substantially conform to a shape of a bottom surface of the kennel. The cushion also includes a peripheral pillow portion having a distal edge connected to peripheral edges of the central pillow portion. The peripheral pillow portion extends upwardly from the peripheral edges of the central pillow portion in a generally vertical direction. Fastening members are provided for fastening the peripheral pillow portion to the kennel so that the peripheral pillow portion is maintained against at least a portion of interior walls of the kennel while a surface of the central pillow portion is maintained against the bottom surface of the kennel.

Other objects, features and characteristics of the present invention, as well as the methods of operation and functions of the related elements of structure, and the combination of the parts and economics of manufacture, will become more apparent upon consideration of the following detailed description and appended claims with reference to the accompanying drawings, all of which form a part of this specification.

DETAILED DESCRIPTION OF THE PREFERRED EMBODIMENTS

Figure 1:
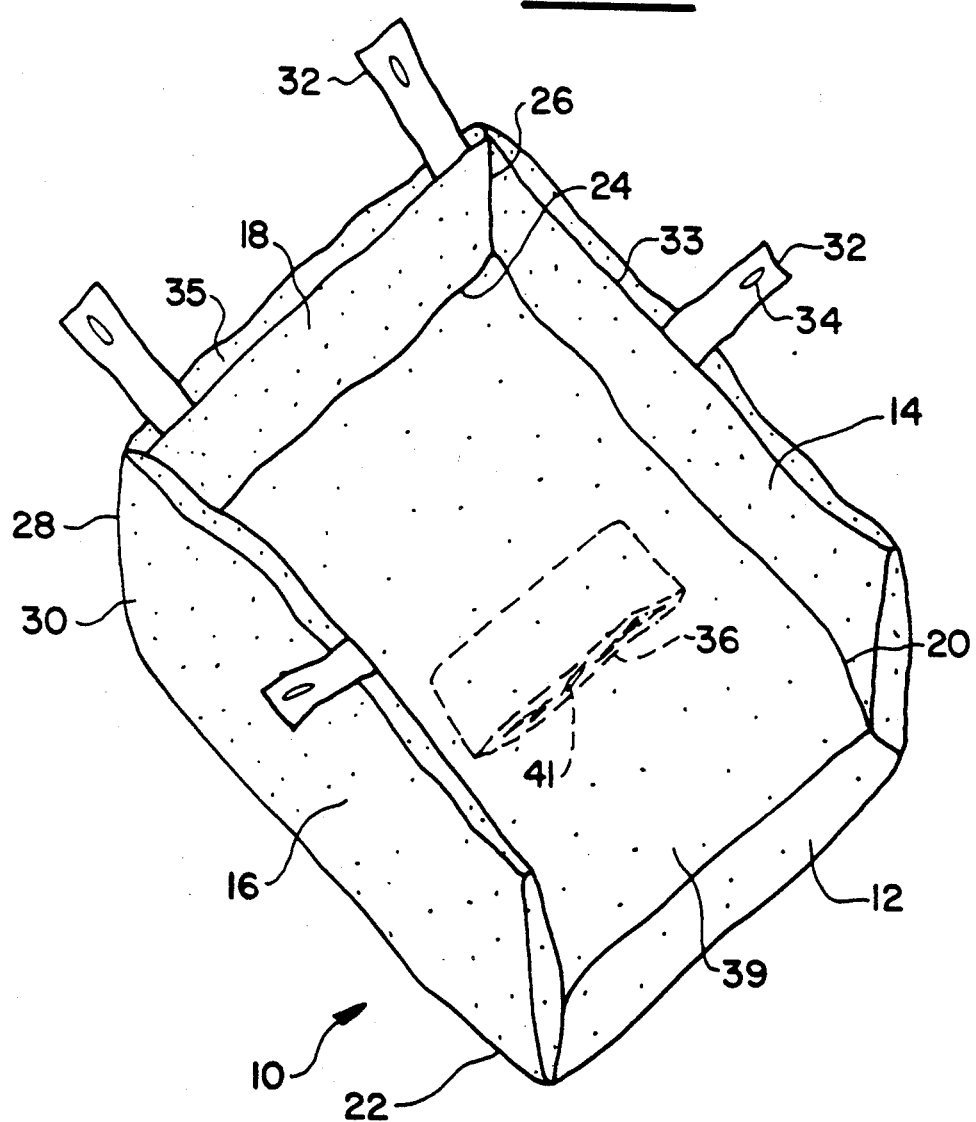
FIG. 1 is a perspective view of the cushion provided in accordance to the principles of the present invention.

In the drawings, a cushion, generally indicated at 10, is shown which embodies the principles of the present invention.

The cushion 10 includes a central pillow portion 12, a pair of opposed side pillow portions 14, 16 connected to the central pillow portion at opposite side edges thereof, and an end pillow portion 18, as shown in FIG. 1. The opposed pillow portions 14, 16 are connected to the central pillow portion 12 by stitch lines 20, 22. The end pillow portion 18 is affixed to the central pillow portion 12 at stitch line 24 and is affixed to the opposed pillow portions 14, 16 at opposite ends thereof by stitch lines 26, 28. Of course, as an alternative, the end pillow portion 18 may be integrally formed with the opposed pillow portions 14, 16, forming a continuous peripheral pillow portion which eliminates the need for stitch lines 26 and 28. The opposed pillow portions 14, 16 and the end pillow portion 18 extend upward from the central pillow portion 12 in a generally vertical direction. The central pillow portion 12, opposed pillow portions 14, 16 and end pillow portion 18 each have a cover 30 constructed of sturdy fabric such as cotton, denim, corduroy, cotton-nylon blend or the like. In addition, the central pillow portion 12, opposed pillow portions 14, 16 and end pillow portion 18 each have a filling, such as polyester fiberfill or other suitable cushioning material, disposed between the cover 30. As is well known in the art, the filling is inserted between the cover 30 prior to closing the last of the peripheral seams. In the illustrative embodiment, the peripheral seams are sewn closed, however, it can be appreciated that one seam of each of the central pillow portion, opposed pillow portions and end pillow portion may be of the kind that is easily separable, such as utilizing a zipper or the like, to permit the filling to be removed for cleaning or refilling.

The peripheral edges 33 of the opposed pillow portions 14, 16 and the peripheral edge 35 of the end pillow portion 18 include at least one strap member 32 affixed thereto by sewing or the like. Each strap member 32 includes a button hole 34, the function of which will become more apparent below. As an alternate to the button hole, an eyelet or the like may be employed in the strap member 32.

The central pillow portion 12 may include at least one pocket 36 disposed in a bottom surface thereof, as shown by the dashed lines in FIG. 1. The pocket 36 may be filled with cedar chips 41 or other material which naturally repels fleas or ticks, when the kennel is used for an animal bedding area.

Figure 2:
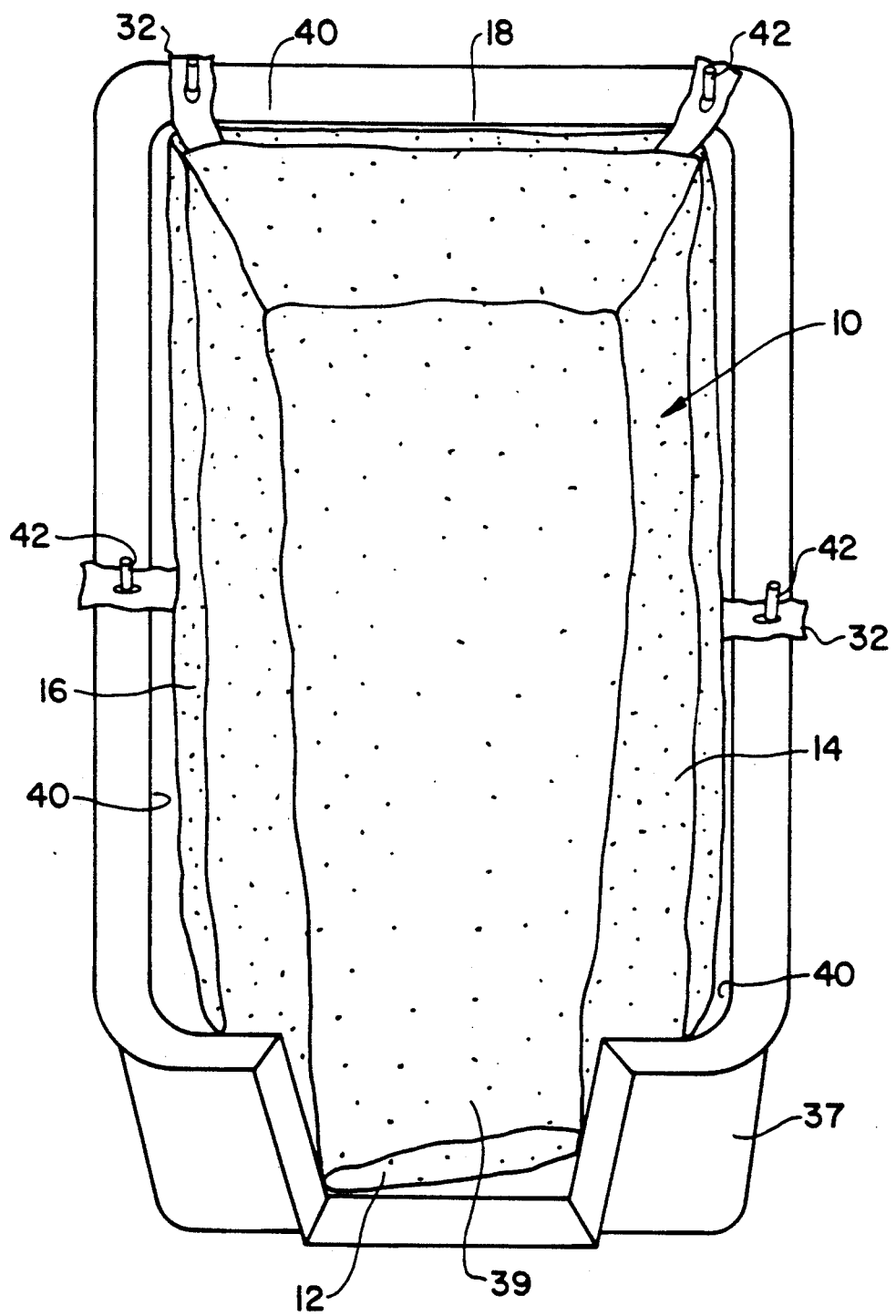
FIG. 2 is a perspective view of the cushion of the present invention disposed in a lower portion of a portable kennel.
Figure 3:
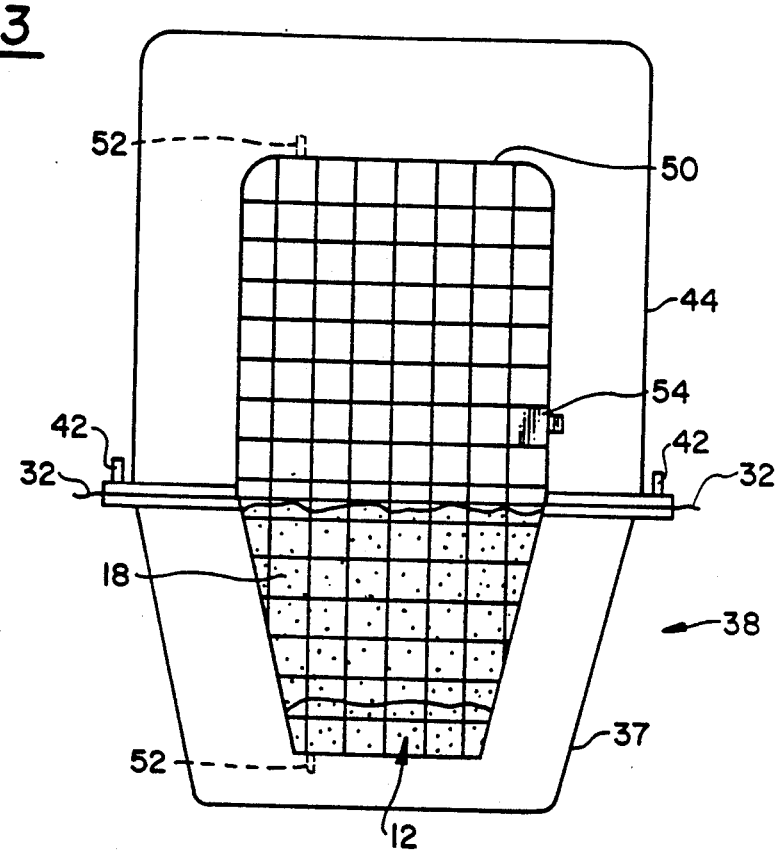
FIG. 3 is a front view of a portable kennel with a cushion of the present invention disposed in a bottom portion thereof.

In FIGS. 2 and 3, the cushion 10 is shown disposed in a bottom portion 37 of a portable kennel, generally indicated at 38. The central pillow portion 12 rests on the floor of the kennel 38, while the opposed pillow portions 14, 16 and end pillow portion 18 extend along the interior walls 40 of the bottom portion 37 of the kennel 38. The cushion 10 includes an open portion 39 disposed adjacent to the kennel door to facilitate removal of the animal disposed within the kennel.

To assure the cushion 10 remains in place while an animal is disposed in the kennel, the button holes 34 are looped over projections 42 protruding from the sides of the bottom portion 37 of the kennel. In the illustrated embodiment, the projections 42 are screws employed to secure the top portion 44 of kennel 38 to the bottom portion 37. The button holes are looped over the screws prior to assembling the top portion 44 to the bottom portion 37. As shown in FIG. 3, once the top portion 44 is affixed to the bottom portion 37, the cushion 10 remains stationary within the kennel, since the strap members 32 are fixedly disposed between the top and bottom portions of the kennel. Thus, the opposed pillow portions 14, 16 and end pillow portion 18 remain disposed against the interior walls 40 of the bottom portion 37 of the kennel, providing comfort to the animal, during transit of the kennel 38. When screw or projections 42 are not required to fasten the top portion 44 to the bottom portion 37, the button holes 34 need not be utilized. The strap members 32 may be clamped between the top portion 44 and the bottom portion 37 to hold the cushion 10 in place. The kennel 38 further includes a door 50. The door includes pin members 52 for movably mounting the door to the kennel 38. The pin members 52 function as hinges when the door is opened or closed. A latch element 54 is provided to securely latch the door once the animal is placed within the kennel 38.

When a mesh-type kennel is employed, the strap members 32 may be tied with a string or tying element to sides of the kennel by utilizing the button holes 34. Accordingly, at least a portion of the interior walls of the kennel are covered with the cushion 10, which remains in position during transit.

Figure 4:
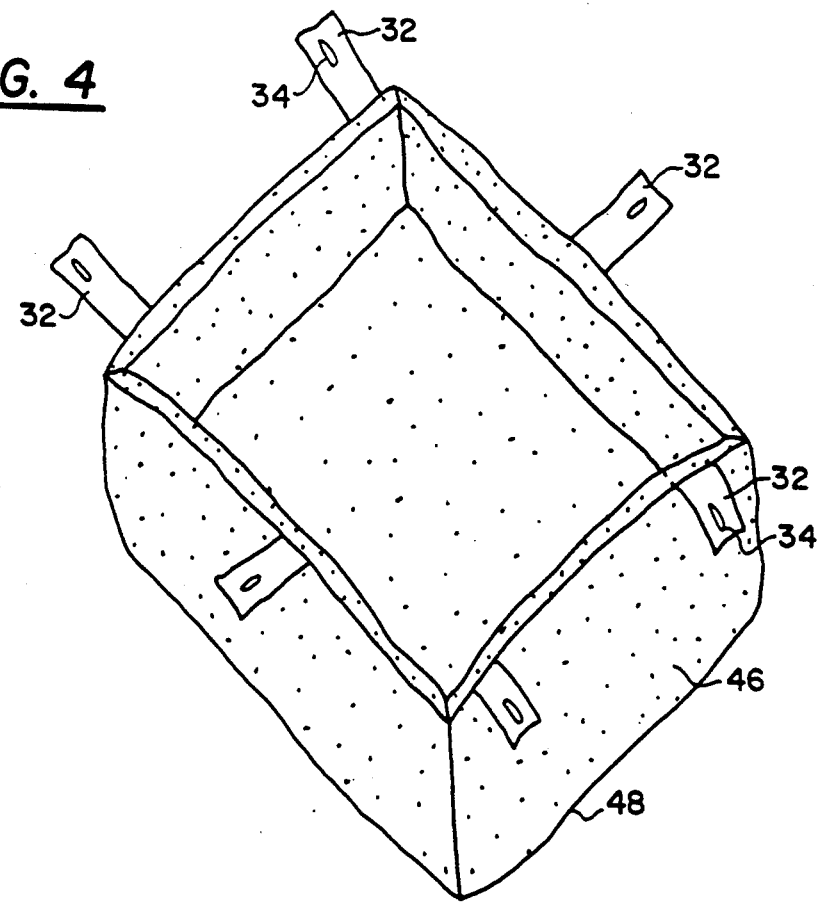
FIG. 4 is a cushion provided in accordance with the principles of a second embodiment of the present invention.

FIG. 4 depicts a cushion 10 provided in accordance with the second embodiment of the present invention. The second embodiment of the cushion 10 is similar in many respects to that of the first embodiment. Accordingly, corresponding parts are assigned the same reference numbers and will not be specifically described.

In this embodiment, a second end pillow portion 46 is affixed to the central pillow portion 12 at stitch line 48, opposite end pillow portion 18. This cushion 10 may be used in larger kennels when required for transporting large animals. Of course, end pillow portion 18, second end pillow portion 46 and the opposed pillow portions 14, 16 may be integrally formed, defining a peripheral pillow portion which reduces the number of stitch lines required to assemble the cushion 10. Second end pillow portion 46 also includes strap members 32 for securing the cushion 10 to the kennel. Thus, the bottom of the kennel and lower portions of all four interior walls are provided with cushioning to protect the animal disposed therein from disruption during transit.

It can be seen that the kennel cushion 10 of the present invention provides an effective means of reducing the disruption and possible injury of an animal in transit.

While the invention has been described in connection with what is presently considered to be the most practical and preferred embodiment, it is understood that the invention is not limited to the disclosed embodiment, but, on the contrary is intended to cover various modifications and equivalent arrangements included within the spirit and scope of the appended claims.

What is claimed:

1. A portable kennel comprising;
   a lower portion having a bottom surface and side walls;
   an upper portion removably affixed to said lower portion having a roof and side walls, said side walls of said upper portion joining with side walls of said lower portion so as to define kennel side walls;
   a door member defined in one of said kennel side walls; and
   a cushion assembly including:
   a central pillow portion shaped to substantially conform to a shape of said bottom surface of said lower portion;
   a peripheral pillow portion having a distal edge connected to peripheral edges of said central pillow portion, said peripheral pillow portion extending upward from said peripheral edges of said central pillow portion in a generally vertical direction, and
   fastening means for fastening said peripheral pillow portion to the kennel, said fastening means being fixedly disposed between said upper portion and said lower portion of said kennel so that said peripheral pillow portion is maintained against at least a portion of interior walls of said lower portion, while a surface of said central pillow portion is maintained against at least a portion of said bottom surface of the lower portion.

2. A portable kennel according to claim 1, wherein said fastening means includes a plurality of strap members each having first and second ends, said first end being affixed to a proximal edge of said peripheral pillow portion, said second end including a hole therethrough, a fastening element being disposed through each of said holes, said fastening element coupling said upper portion of said kennel to said lower portion.

3. A method of assembling a portable kennel having an upper portion, a lower portion, a door and a cushion assembly, the method comprising the steps of:
   placing said cushion assembly having a central pillow and a peripheral pillow in said lower portion so that said central pillow is disposed against a bottom surface thereof and said peripheral pillow is disposed against at least three interior side walls thereof,
   securing said upper portion to said lower portion so that a portion of said cushion assembly is fixedly disposed between said upper portion and said lower portion so as to maintain said peripheral pillow against at least a portion of said interior walls of said lower portion, while a surface of said central pillow is maintained against at least a portion of said bottom surface of the lower portion, and
   installing said door so as to close an open side wall defined in the kennel.

4. The method according to claim 3, wherein the step of securing said upper portion to said lower portion includes using screws to connect said upper portion to said lower portion, said portion of said cushion being fixed between said upper and said lower portions including strap members having button-holes therein, said buttonholes being looped over said screws prior to securing said upper portion to said lower portion.

* * * * *